(12) United States Patent
Kutsch et al.

(10) Patent No.: US 11,149,623 B2
(45) Date of Patent: Oct. 19, 2021

(54) PNEUMATIC MOTOR ASSEMBLY UTILIZING COMPRESSED GAS TO ROTATE A MAGNET ASSEMBLY AND HAVING A COOLING JACKET SURROUNDING THE MOTOR AND THE MAGNET ASSEMBLY TO CIRCULATE THE COMPRESSED GAS FOR COOLING THE MAGNET ASSEMBLY, AND A FLOW INDUCTION SYSTEM USING THE SAME

(71) Applicant: TERRESTRIAL ENERGY INC., Oakville (CA)

(72) Inventors: John Kutsch, Harvard, IL (US); David Leblanc, Ottawa (CA)

(73) Assignee: TERRESTRIAL ENERGY INC., Oakville (CA)

( * ) Notice: Subject to any disclaimer, the term of this patent is extended or adjusted under 35 U.S.C. 154(b) by 498 days.

(21) Appl. No.: 15/756,872

(22) PCT Filed: Sep. 1, 2016

(86) PCT No.: PCT/CA2016/051039
§ 371 (c)(1),
(2) Date: Mar. 1, 2018

(87) PCT Pub. No.: WO2017/035657
PCT Pub. Date: Mar. 9, 2017

(65) Prior Publication Data
US 2018/0258829 A1    Sep. 13, 2018

Related U.S. Application Data

(60) Provisional application No. 62/214,573, filed on Sep. 4, 2015.

(51) Int. Cl.
*F01P 1/06*    (2006.01)
*F01D 15/08*    (2006.01)
(Continued)

(52) U.S. Cl.
CPC ............... *F01P 1/06* (2013.01); *F01D 15/08* (2013.01); *F04D 7/06* (2013.01); *F04D 13/024* (2013.01);
(Continued)

(58) Field of Classification Search
CPC .......... F04D 13/024; F04D 13/04; F04D 7/06; F04D 29/588; F01D 15/08
(Continued)

(56) References Cited

U.S. PATENT DOCUMENTS 2,229,498 A * 1/1941 Farmer ................... B60T 17/02
165/231
2,994,795 A * 8/1961 Cattabiani .............. H02K 5/128
310/86
(Continued)

FOREIGN PATENT DOCUMENTS

CN        1735366 A    2/2006
CN      101466460 A    6/2009
(Continued)

OTHER PUBLICATIONS

International Patent Application No. PCT/CA2016/051039, International Preliminary Report on Patentability dated Mar. 15, 2018.
(Continued)

*Primary Examiner* — Patrick Hamo
*Assistant Examiner* — Benjamin Doyle
(74) *Attorney, Agent, or Firm* — Borden Ladner Gervais LLP; Louis B. Allard

(57) ABSTRACT

A pneumatic motor assembly that includes a pneumatic motor, which is driven by a compressed gas. The pneumatic motor assembly has a magnet assembly that magnetically couples the pneumatic motor assembly to an implement. After having being used to drive a pneumatic motor, the gas, which has expanded and become colder, cools the magnet (Continued)

assembly The pneumatic motor assembly can thus enable the use to the implement at temperatures at which the magnet assembly would otherwise reach or exceed the maximum operating temperature of the magnet assembly. A flow induction system that includes the pneumatic motor assembly. A method of operating a pneumatic motor assembly that also cools a magnet assembly that is part of the pneumatic motor assembly.

12 Claims, 8 Drawing Sheets

(51) Int. Cl.
| | |
|---|---|
| G21C 15/243 | (2006.01) |
| F04D 13/02 | (2006.01) |
| F04D 13/04 | (2006.01) |
| F04D 29/58 | (2006.01) |
| G21C 1/22 | (2006.01) |
| G21C 3/54 | (2006.01) |
| F04D 7/06 | (2006.01) |
| F01D 1/36 | (2006.01) |

(52) U.S. Cl.
CPC ........... *F04D 13/04* (2013.01); *F04D 29/588* (2013.01); *G21C 1/22* (2013.01); *G21C 3/54* (2013.01); *G21C 15/243* (2013.01); *F01D 1/36* (2013.01); *Y02E 30/30* (2013.01)

(58) Field of Classification Search
USPC ......................................... 417/375, 379, 384
See application file for complete search history.

(56) References Cited

U.S. PATENT DOCUMENTS

| | | | | |
|---|---|---|---|---|
| 3,017,072 | A * | 1/1962 | Hagg | F04D 29/047 |
| | | | | 310/61 |
| 3,135,211 | A * | 6/1964 | Pezzillo | F04D 13/0613 |
| | | | | 417/357 |
| 3,488,535 | A * | 1/1970 | Baermann | H02K 49/046 |
| | | | | 310/93 |
| 3,765,168 | A * | 10/1973 | Wagle | F02C 7/16 |
| | | | | 60/782 |
| 3,794,448 | A * | 2/1974 | Albertson | F01D 1/36 |
| | | | | 417/406 |
| 4,016,893 | A * | 4/1977 | Scott | B08B 3/006 |
| | | | | 134/115 R |
| 4,120,618 | A * | 10/1978 | Klaus | F04D 1/06 |
| | | | | 310/156.26 |
| 4,669,951 | A * | 6/1987 | Stern | F01D 15/08 |
| | | | | 415/90 |
| 4,732,537 | A * | 3/1988 | Kusz | F04D 13/04 |
| | | | | 415/202 |
| 5,484,265 | A * | 1/1996 | Horvath | F04D 15/0263 |
| | | | | 417/32 |
| 5,834,872 | A | 11/1998 | Lamb | |
| 5,944,496 | A * | 8/1999 | Cooper | F04D 7/065 |
| | | | | 266/235 |
| 6,280,157 | B1 * | 8/2001 | Cooper | F04D 5/002 |
| | | | | 417/423.7 |
| 7,380,974 | B2 | 6/2008 | Tessien et al. | |
| 7,520,657 | B2 * | 4/2009 | Andrews | B01F 13/0818 |
| | | | | 366/144 |
| 7,780,405 | B2 * | 8/2010 | Araki | F04D 25/082 |
| | | | | 415/204 |
| 9,328,615 | B2 * | 5/2016 | Cooper | H02K 5/128 |
| | | | | 310/86 |
| 2003/0197080 | A1 * | 10/2003 | Karkos, Jr. | A23G 9/12 |
| | | | | 241/92 |
| 2004/0020737 | A1 * | 2/2004 | Webber | F16D 13/12 |
| | | | | 192/35 |
| 2004/0076533 | A1 * | 4/2004 | Cooper | F04D 13/021 |
| | | | | 417/423.6 |
| 2004/0115079 | A1 * | 6/2004 | Cooper | F04D 7/065 |
| | | | | 417/424.1 |
| 2004/0146411 | A1 * | 7/2004 | Maceyka | H02K 9/06 |
| | | | | 417/366 |
| 2006/0086729 | A1 * | 4/2006 | Lunneborg | H05B 6/108 |
| | | | | 219/628 |
| 2008/0115527 | A1 * | 5/2008 | Doty | H02K 1/32 |
| | | | | 62/498 |
| 2010/0148611 | A1 * | 6/2010 | Wang | H02K 21/24 |
| | | | | 310/156.37 |
| 2013/0093271 | A1 * | 4/2013 | Luke | H02K 9/06 |
| | | | | 417/366 |
| 2013/0230382 | A1 * | 9/2013 | De Larminat | F04D 25/082 |
| | | | | 415/204 |
| 2014/0346777 | A1 * | 11/2014 | Blanchet | F02C 7/16 |
| | | | | 60/782 |
| 2015/0143819 | A1 | 5/2015 | Polihronov et al. | |
| 2016/0061210 | A1 * | 3/2016 | Hasegawa | F04D 13/0613 |
| | | | | 417/357 |
| 2016/0145980 | A1 * | 5/2016 | Cunningham | F04D 29/047 |
| | | | | 310/61 |
| 2016/0260509 | A1 | 9/2016 | Kim et al. | |
| 2020/0067376 | A1 * | 2/2020 | Judge | B60T 17/02 |
| | | | | 165/231 |

FOREIGN PATENT DOCUMENTS

| | | | |
|---|---|---|---|
| CN | 101526032 | A | 9/2009 |
| CN | 103185010 | A | 7/2013 |
| DE | 4113638 | A1 | 10/1992 |
| EP | 0661425 | A1 | 7/1995 |
| JP | S50152302 | A | 12/1975 |
| JP | S5324903 | U | 3/1978 |
| JP | S6069210 | A | 4/1985 |
| JP | S6172896 | A | 4/1986 |
| JP | H07229499 | A | 8/1995 |
| JP | 2001304170 | A | 10/2001 |
| JP | 2009125361 | A | 6/2009 |
| JP | 2013057250 | A | 3/2013 |
| WO | 215080447 | A1 | 6/2015 |

OTHER PUBLICATIONS

International Patent Application No. PCT/CA2016/051039, International Search Report and Written Opinion dated Nov. 8, 2016.
European Patent Application No. 16840476.2, Office Action dated Feb. 27, 2020.
Japanese Patent Application No. 2018-530946, Office Action dated May 26, 2020—English Translation Available.
European Patent Application No. 16840476.2, Extended European Search Report dated Mar. 22, 2019.
Chinese Patent Application No. 201680051407 4, Office Action dated Feb. 3, 2021—English Translation not Available.
European Patent Application No. 16840476.2, Communication under Rule 71(3) EPC dated Feb. 26, 2021.
Indian Patent Application No. IN201817010482, Office Action dated Oct. 29, 2020.
Japanese Patent Application No. 2018-530946, Office Action dated Jan. 12, 2021—English Translation Available.

* cited by examiner

PNEUMATIC MOTOR ASSEMBLY UTILIZING COMPRESSED GAS TO ROTATE A MAGNET ASSEMBLY AND HAVING A COOLING JACKET SURROUNDING THE MOTOR AND THE MAGNET ASSEMBLY TO CIRCULATE THE COMPRESSED GAS FOR COOLING THE MAGNET ASSEMBLY, AND A FLOW INDUCTION SYSTEM USING THE SAME

FIELD

The present disclosure relates to pneumatic motor assemblies. More particularly, the present disclosure relates to flow inductions system using pneumatic motors and to methods of operating pneumatic motor assemblies.

BACKGROUND OF THE INVENTION

Systems that use magnetic coupling between a motor and an implement are known. The use of such systems in high temperature environments is prohibited when the temperature is greater than the maximum operating temperature of the magnets used for the magnetic coupling. This is because the magnetic properties of the magnets decrease greatly at such temperature.

Systems that allow for cooling of the magnets do exist but are complicated and prone to failure.

Improvements in systems that use magnetic coupling between a motor and an implement are therefore desirable.

SUMMARY

The present disclosure provides, in some embodiments, a pneumatic motor assembly that comprises a pneumatic motor and a magnet assembly connected to pneumatic motor. The pneumatic motor assembly also comprises a cooling structure that is thermally connected to the magnet assembly. The pneumatic motor is driven by compressed gas, which, after having gone through the pneumatic motor to drive the pneumatic motor, is circulated in the cooling structure, which cools the magnet assembly. Advantageously, upon the compressed gas entering the pneumatic motor assembly, the compressed gas will expand and undergo a decrease in temperature, which allows for better heat transfer between the magnet assembly and the gas. The present disclosure further provides, in other embodiments, a flow induction system that used the pneumatic motor assembly of the present disclosure. As such, by cooling the magnet assembly, the pneumatic motor assembly and the flow induction system of the present disclosure can be operated in environments where elevated temperatures would otherwise be prohibited because of the elevated temperatures reaching the maximum operating temperature of the magnets comprised in the magnet assembly.

In a first aspect of the present disclosure, there is provided a pneumatic motor assembly that comprises: a pneumatic motor configured to receive gas, the gas received at the pneumatic motor being compressed gas, the gas to circulate through the pneumatic motor to drive the pneumatic motor into rotation, the pneumatic motor further configured to output the gas subsequent the gas having driven the pneumatic motor; a magnet assembly connected to the pneumatic motor, the pneumatic motor configured to rotate the magnet assembly; and a cooling structure thermally connected to the magnet assembly, the cooling structure configured to receive the gas output from the pneumatic motor, the gas received at the cooling structure to circulate through the cooling structure, the gas to expand when circulating through at least one of the pneumatic motor and the cooling structure, an expansion of the gas causing a reduction in temperature of the gas to obtain a cooled gas, the cooling structure to transfer heat from the magnet assembly to the cooled gas circulating in the cooling structure.

In a second aspect of the present disclosure, there is provided a flow induction system to induce flow in a liquid, the flow induction system comprises: a pneumatic motor configured to receive gas, the gas received at the pneumatic motor being compressed gas, the gas to circulate through the pneumatic motor to drive the pneumatic motor into rotation, the pneumatic motor further configured to output the gas subsequent the gas having driven the pneumatic motor; a magnet assembly connected to the pneumatic motor, the pneumatic motor configured to rotate the magnet assembly; a shaft assembly magnetically coupled to the magnet assembly, the shaft assembly having a flow inducer assembly configured for immersion in a liquid, the magnet assembly configured to rotate the shaft assembly and the flow inducer assembly to induce flow in the liquid; and a cooling structure thermally connected to the magnet assembly, the cooling structure configured to receive the gas output from the pneumatic motor, the gas received at the cooling structure to circulate through the cooling structure, the gas to expand when circulating through at least one of the pneumatic motor and the cooling structure, an expansion of the gas causing a reduction in temperature of the gas to obtain a cooled, the cooling structure to transfer heat from the magnet assembly to the cooled gas circulating in the cooling structure.

Other aspects and features of the present disclosure will become apparent to those ordinarily skilled in the art upon review of the following description of specific embodiments in conjunction with the accompanying figures.

BRIEF DESCRIPTION OF THE FIGURES

Embodiments of the present disclosure will now be described, by way of example only, with reference to the attached Figures.

DETAILED DESCRIPTION

Generally, the present disclosure provides a pneumatic motor assembly that includes a pneumatic motor and magnets connected to the pneumatic motor. These magnets are magnetically coupled to a shaft assembly that is rotated upon powering of the pneumatic motor. The pneumatic motor is configured to receive a compressed gas (or more generally, a compressed fluid) that powers the pneumatic motor. The pneumatic motor is further configured to guide the compressed gas from the pneumatic motor through a jacket (a compartment) that is in thermal contact with the magnets. The jacket is vented to atmosphere. As the compressed gas powers the pneumatic motor and is guided through the jacket to atmosphere, its pressure and temperature decrease. As the jacket is in thermal contact with the magnets, and when the magnets are at a higher temperature than the gas, heat is transferred from the magnets to the gas, which allows for cooling of the magnets. The pneumatic motor assembly of the present disclosure is advantageous in high temperature environments where the magnets are subject to temperatures that may reach their maximum operating temperature, beyond which the magnetic force of the magnets decreases. By providing cooling of the magnets, their magnetic characteristics can be maintained in high temperature environments. The pneumatic motor assembly of the present disclosure can magnetically couple to any suitable implement to rotate the implement. The implement can be a shaft assembly, as will be described below.

The present disclosure further provides a flow induction system that uses the pneumatic motor assembly of the present disclosure. The flow induction system is used to induce flow in a liquid. As an example, the liquid can be a molten salt present in a molten salt nuclear reactor.

In the context of the present disclosure, a pneumatic motor is to be understood as meaning any type of motor that does mechanical work when powered by an expanding compressed fluid. Also in the context of the present disclosure, elements in thermal contact are elements that can exchange energy through the process of heat.

Figure 1A:
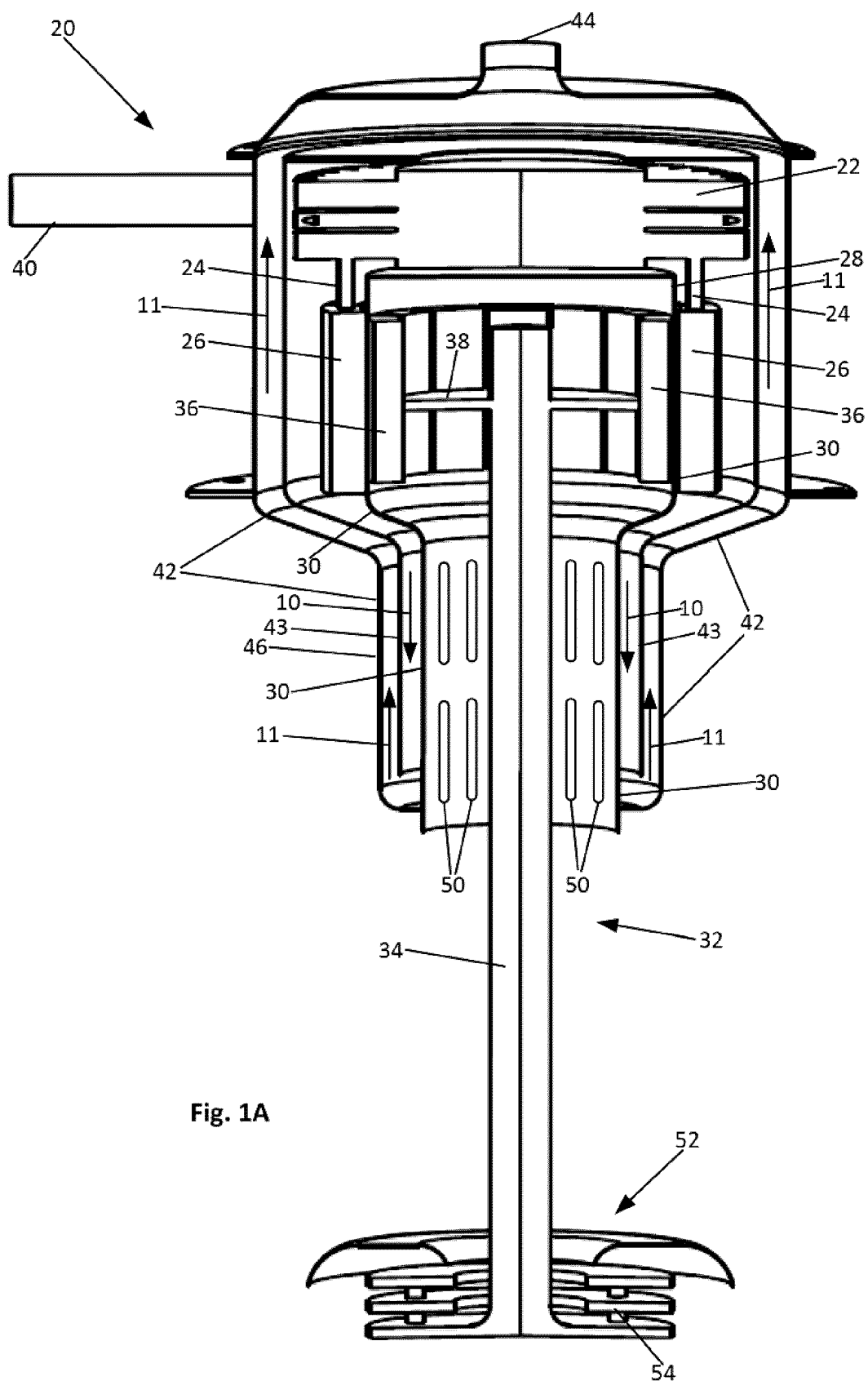
FIG. 1A shows an elevation, cutaway view of an embodiment of a flow induction system in accordance with the present disclosure.

FIG. 1A shows an elevation, cutaway view of an embodiment of a flow induction system 20 of the present disclosure. The flow induction system 20 includes pneumatic motor assembly that comprises a pneumatic motor 22 and a sleeve 24 secured to the pneumatic motor. The sleeve 24 has secured thereto magnets 26, which are also part of the pneumatic motor assembly. As such, the magnets 26 are connected to the pneumatic motor 22. As will be understood by the skilled worker, even though the magnets 26 are shown as connected to the pneumatic motor 22 via the sleeve 24, they can be, in other embodiments connected directly to the pneumatic motor 22, without departing from the scope of the present disclosure. The connection between the various elements (pneumatic motor, sleeve, magnets) can be effected through any suitable connection means such as, for example, fasteners, solder, interconnecting mating features defined by the elements, etc. In yet other embodiments, there may be, instead of a sleeve, individual connecting members connecting the magnets to the pneumatic motor.

Additionally, the flow induction system 20 includes a housing 30 and a shaft assembly 32 contained in the housing. The sleeve 24 and the magnets 26 surround a portion 28 (in this embodiment, a top portion) of the housing 30. The flow induction system 20 further has a jacket 42 that surrounds the pneumatic motor 22, the sleeve 24 and the magnets 26. The jacket 42 is in thermal contact with the housing 30. The jacket 42 is an example of a cooling structure. Another example would be a cooling coil encircling the housing 30. An example of such a coil is provided elsewhere in this document. The jacket 42, or any alternative cooling structure, is part of the pneumatic motor assembly.

The shaft assembly 32 includes a shaft 34 secured to a plate 38, which is secured to magnets 36 that are magnetically coupled to the magnets 26. As such, the shaft assembly 32 is magnetically coupled to the magnets 26. The shaft assembly 32 and the portion 28 of the housing 30 are configured to define a gap (spacing) between the magnets 36 and the portion 28 of the housing. The pneumatic motor 22, the sleeve 24, the magnets 26 and the portion 28 of the housing are configured to define another gap between the magnets 26 and the portion 28 of the housing. The flow induction system 20 also includes a flow inducer assembly 52, connected to the shaft 32 and configured to pump (move, induce flow of) a fluid in which the flow inducer assembly 52 is placed. In the present embodiment, the flow inducer assembly 52 includes a boundary layer, disc flow inducer 54, which is connected to the shaft 34.

In the present embodiment, the pneumatic motor 22 is a boundary layer disc flow turbine. Compressed gas enters the boundary layer disc flow turbine tangentially to the disc flow turbine and exits the boundary layer disc flow turbine at a centre region thereof. In the present embodiment, gas exits the pneumatic motor 22 at the central bottom region of the pneumatic motor 22, forming an air cushion between the pneumatic motor 22 and the housing 30. From there, the gas flows downward between the housing 30 and the magnets 26. In other embodiments, the pneumatic motor assembly can be configured for the gas to exit the pneumatic motor at the top centre region of the pneumatic motor. In yet other embodiments, the pneumatic motor assembly can be configured such that the gas exits the pneumatic motor at both the top centre region and the bottom centre region of the pneumatic motor.

Figure 1B:
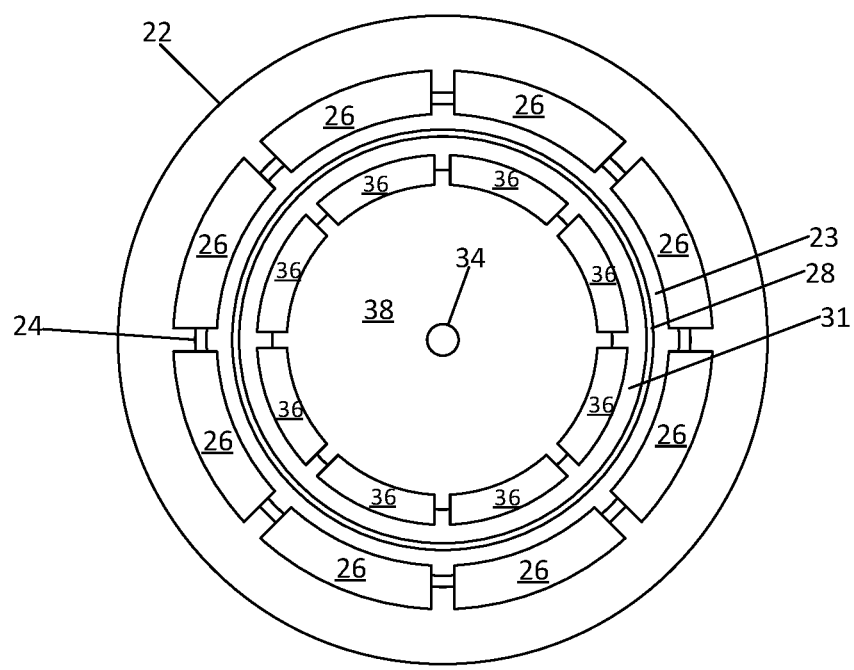
FIG. 1B shows a bottom cutaway view of some elements of the flow induction system of FIG. 1A.
Figure 1C:
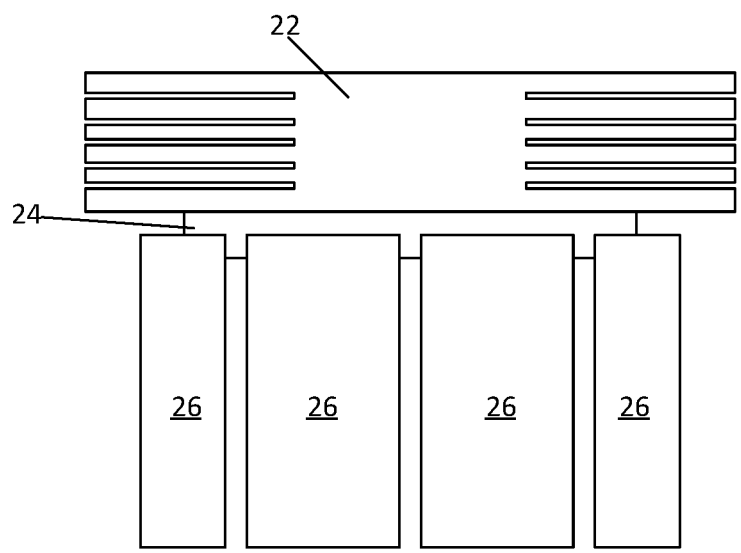
FIG. 1C shows a side elevation view of some elements of the flow induction system of FIG. 1A.

FIG. 1B shows a bottom cutaway view of pneumatic motor 22, the sleeve 24, the magnets 26, the portion 28 of the housing 30, the plate 38, the magnets 36 secured to the plate 38, and the shaft 34. A gap 23 is shown in FIG. 1B. The gap 23 is between the magnets 26 and the portion 28. Another gap 31 is shown in FIG. 1B. The gap 31 is between the portion 28 and the magnets 36. FIG. 1C shows a side elevation cutaway view of the pneumatic motor 22, the sleeve 24 and the magnets 26 of FIG. 1B.

Referring now to FIG. 1A, the pneumatic motor 22 is powered by a compressed fluid, for example, a compressed gas, received from a compressed fluid source (not shown). As the pneumatic motor 22 is powered, it begins to rotate, causing the magnets 26 to also rotate. As the magnets 26 are magnetically coupled to the magnets 36 of the shaft assembly 32, the magnets 36 and the whole shaft assembly 32 will also rotate, causing the flow inducer assembly 52 to induce flow in the liquid in which it is placed.

The flow induction system 20 comprises a fluid inlet 40 through which the compressed fluid is received. The compress fluid powers the pneumatic motor 22 and exits therefrom into the jacket 42, which surrounds the housing 30. As the compressed fluid loses pressure as it powers the pneumatic motor 22, the temperature of the fluid decreases. The jacket 42 has an outlet 44 from which the fluid, now at a lower pressure and at a lower temperature than at the fluid inlet 40, is vented. As such, when the temperature of the fluid in the jacket 42 is lower than the temperature of the elements of the pump system that are in thermal contact with the jacket 42, the temperature of these elements is decreased in accordance with the temperature difference between the fluid and the elements in question and in accordance with the thermal conductivity of the elements. Upon exiting the outlet 44, the gas can be returned to a compressor (not shown) and reused.

Figure 4:
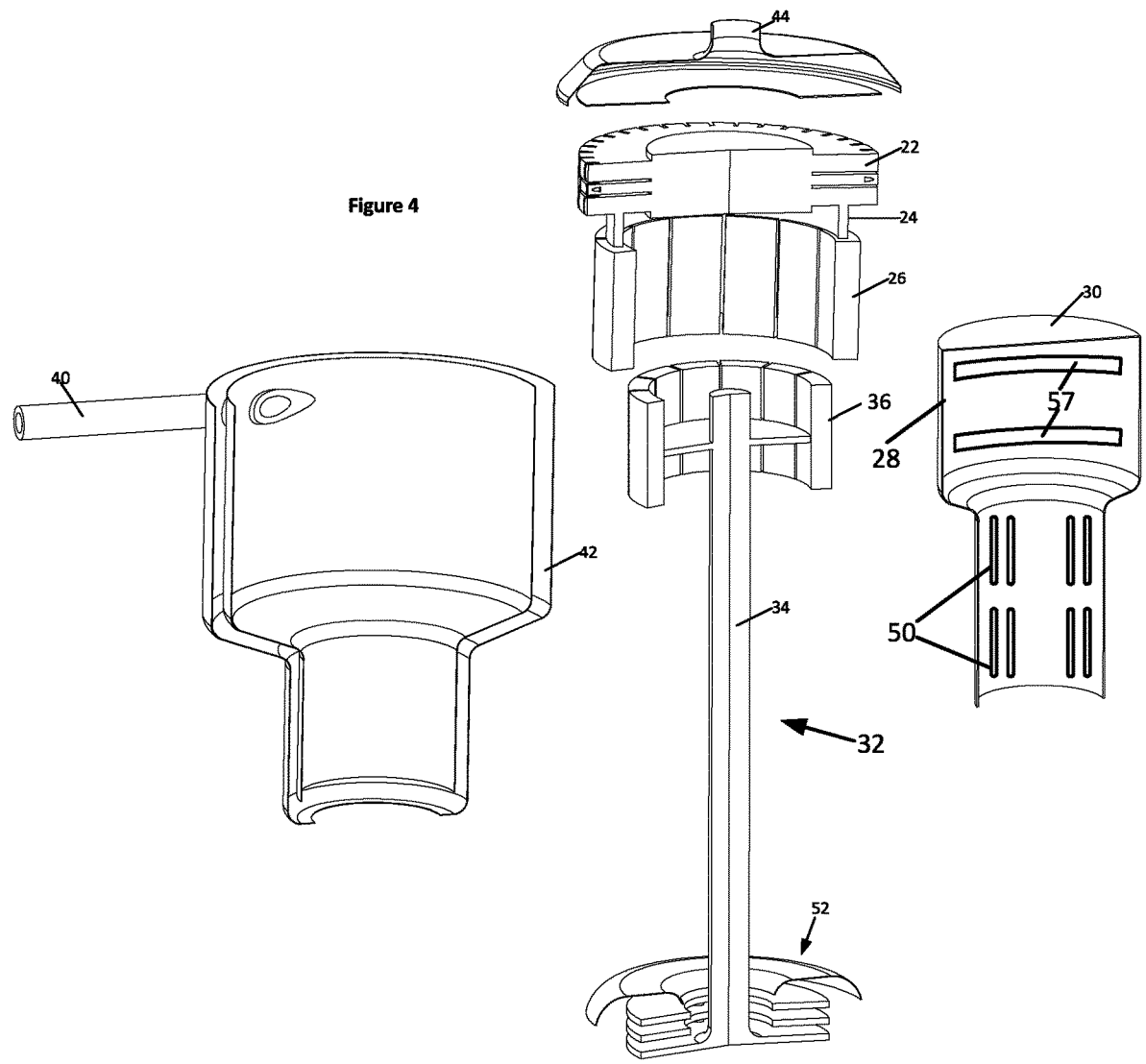
FIG. 4 shows a perspective, cutaway and exploded view of the flow induction system of FIG. 1.

In the present embodiment, the housing 30 also comprises thrust bearing magnets that maintain the shaft assembly 32 within the housing. In the present embodiment, the housing 30 further comprises centering magnets 50 that maintain the shaft assembly 32 centered in the housing 30. An embodiment of thrust bearing magnets is shown in FIG. 4 and is described further below.

Referring to FIG. 1A, in the present embodiment, the jacket 42 is configured to guide the fluid exiting the pneumatic motor 22 downwards (indicated by arrows 10), between a partition 43 of the jacket 42 and the elements surrounded by the jacket 42, for example, the magnets 26 and the housing 30, which is connected to thrust bearing magnets and to the centering magnets 50. At the bottom end of the partition 43, the fluid is directed (flows) upwards (indicated by arrows 11) between the partition 43 and an outer wall 46 of the jacket 42. The fluid is subsequently vented at outlet 44.

Consequently, at the fluid propagates through the jacket 42, from the pneumatic motor 22 towards the outlet 44, the elements of the flow induction system that are surrounded by the jacket are cooled. For example, the magnets 26, the thrust bearing magnets, and the centering magnets 50 are cooled. The cooling of the magnets allows the flow induction system 20 to be used in elevated temperature environments where, without cooling, the various magnets would see their temperature reach or go beyond their respective maximum operating temperature, thereby losing much of their magnetism and ability to perform the function for which they were designed.

As will be understood by the skilled worker, cooling of the inner magnets 36 is accomplished by radiant and convective heat transfer first through the housing 30 (which can also be referred to as a static shield) and then through the outer magnets 26 that are cooled by the jacket 42.

Figure 2:
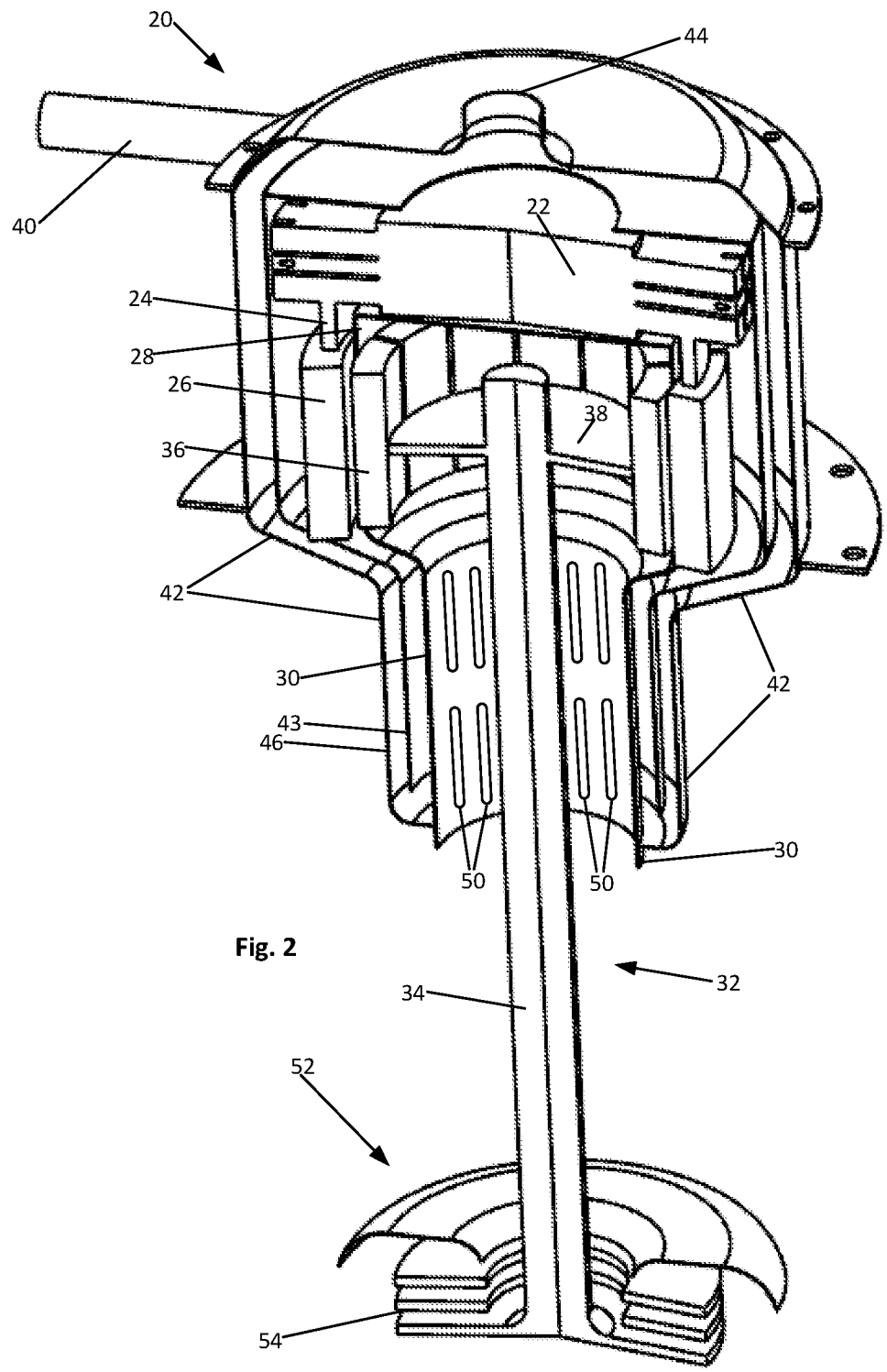
FIG. 2 shows a top, cutaway perspective view of the flow induction system of FIG. 1.

FIG. 2 shows a top, cutaway, perspective view of the flow induction system 20 of FIG. 1A.

Figure 3:
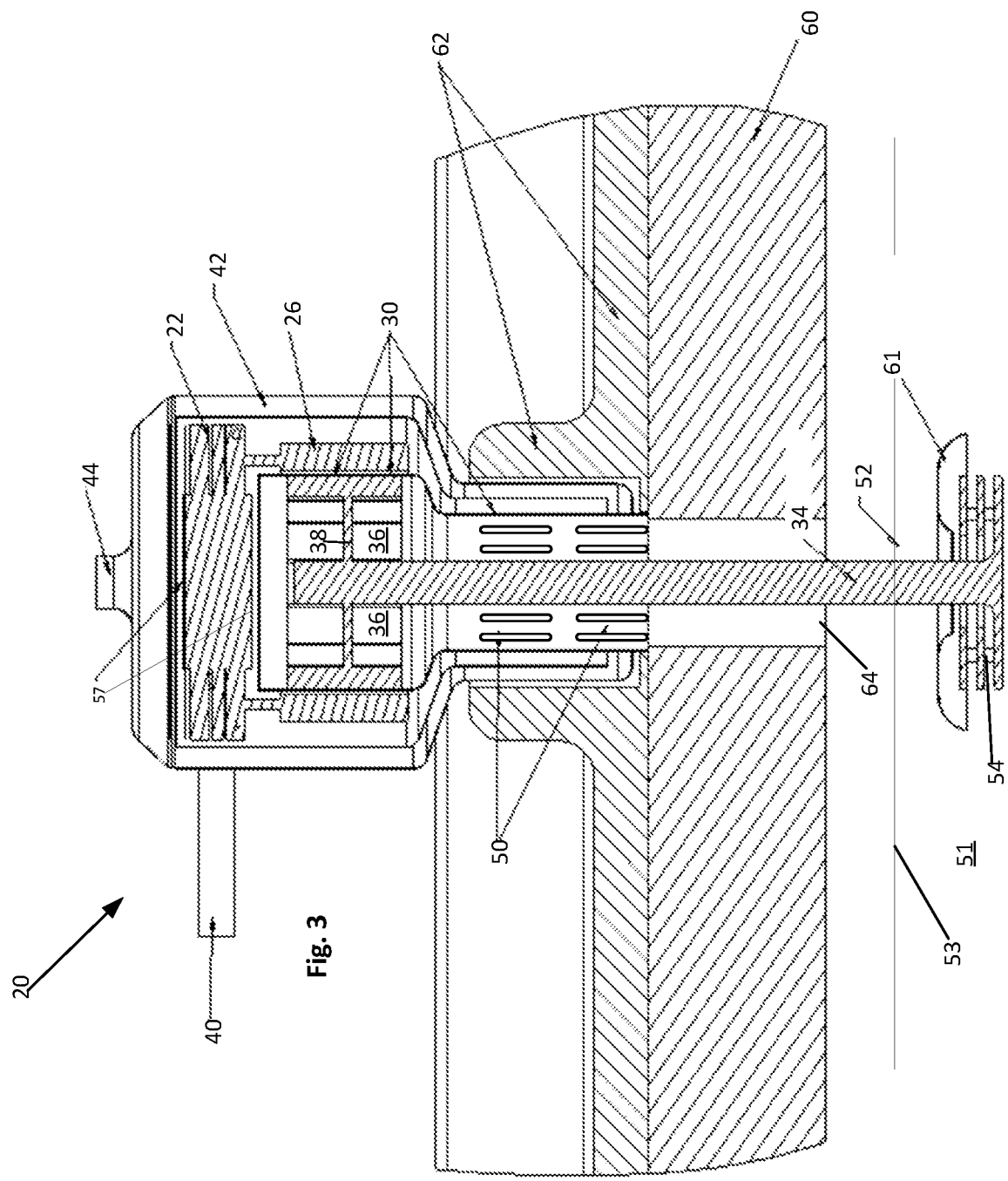
FIG. 3 shows a cross-sectional cutaway view of another embodiment of the flow induction system of the present disclosure.

FIG. 3 shows a cross-sectional cutaway view of another embodiment of the flow induction system 20 of the present disclosure. In this embodiment, the flow induction system 20 is used to induce flow in molten salt 51 used as a fuel in a nuclear reactor core (not shown). The flow induction assembly 52 in FIG. 3 is submerged in the molten salt, which can be at a temperature of about 800° C. or at any other suitable temperature. The level of the molten salt is shown, in FIG. 3, as line 53. The nuclear reactor core is located in a vessel of which only an upper plate 60 is shown. The upper plate 60 has formed thereon a thermal insulation layer 62 to insulate the exterior of the vessel from the heat generated in the vessel. FIG. 3 also shows thrust bearing magnets 57 above and below the pneumatic motor 22 and a flow bowl 61, which is part of the flow induction assembly 52.

The flow induction system 20 is secured to the vessel through any suitable means such as, for example, bolts, welding, etc. The shaft assembly 32 extends from outside the vessel to inside the vessel, through the housing 30 of the flow induction system and through an opening 64 defined in the upper plate 60. The temperature of the molten salt 51 and the temperature in the region between the molten salt 51 and the upper plate 60 can be at about 700° C. Without the above noted cooled gas circulating in the cooling structure (e.g., the jacket 42), the temperature throughout the opening 64 and the housing 30 will not be substantially below the temperature (about 700° C.) of the molten salt 51, which, for many type of magnets, is above the maximum operating temperature of the magnets themselves. Table I shows a list of magnetic materials with their maximum operating temperature ($T_{max}$) and their Curie temperature ($T_{Curie}$), the Curie temperature being the temperature at which the elementary magnetic moments in the material becomes randomized and the material demagnetized.

TABLE I

| Material | $T_{max}$ (° C.) | $T_{Curie}$ (° C.) |
|---|---|---|
| Neodymium Iron Boron | 150 | 310 |
| Samarium Cobalt | 300 | 750 |
| Alnico | 540 | 860 |
| Ferrite | 300 | 460 |

To prevent the magnets from reaching their maximum operating temperature, compressed gas, for example, nitrogen ($N_2$) can be provided to the flow induction assembly 20 at the fluid inlet 40 at a temperature of 50° C. The expanded and cooled gas extracts, through the housing 30, heat present in the magnets 26 and in the housing 30 and the temperature in the housing can be kept, in some embodiments, below 300° C., which is below the maximum operating temperature of most magnets. The cooled gas circulating the flow induction assembly 20 exits therefrom, at the outlet 44, at a temperature of, for example, about 25° C. As will be understood by the skilled worker, the pneumatic motor assembly can be configured to operate with any suitable gas, at any suitable pressure, and at any suitable temperature of the gas at the input of the pneumatic motor assembly.

In some embodiment, in addition to being thermally connected to the magnet assembly, the cooling jacket 42 of the present embodiment is also thermally connected to the outside environment of the pneumatic motor assembly and the flow induction system. The jacket thus also provides cooling to this outside environment.

Compressed gas other than nitrogen can also be used to power and cool the flow induction assembly of the present disclosure. For example, inert gases such as argon, helium, CO2, air, etc., which can be relatively inexpensive and abundant.

In other embodiments, instead of using compressed gas to drive and cool the flow induction system of the present disclosure, a compressed liquid can be used. Examples of such liquids include glycol, mineral oil, deionized water etc. In such embodiments, the liquid would flow through the liquid jacket to remove heat therefrom.

In further embodiments, phase changing fluids can be used to drive and cool the flow induction assembly of the present disclosure. Examples of such phase changing fluids include ammonia, halocarbon products such as dichlorodifluoromethane (Freon-12™), and hydrofluorocarbons—these can be liquid upon entering the fluid inlet 40 and rapidly expand into a gas used to power and cool the flow induction system.

In other embodiments, where a non phase changing liquid is used, a liquid powered motor would be used instead of a pneumatic motor. Such liquid powered motors can include, for example, impulse turbines, vane motors, and boundary layer disc flow turbines.

In further embodiments, simple fluids can be used to drive the flow induction assembly of the present disclosure. Such fluids could also provide cooling action by having the fluids pass through a cooling apparatus such as a radiator external to the flow induction assembly, for example in an adjacent chamber thermally insulated from the high temperature region. Examples of such simple fluids include liquid metals such as lead or sodium. Further examples include high temperature heat transfer oils such as used in solar energy receivers or other molten salts including nitrate based salts, fluoride or chloride based molten salts.

FIG. 4 shows a perspective, cutaway and exploded view of the embodiment of FIG. 3. In some embodiments, as shown at FIG. 4, the housing 30 can have the centering magnets 50 formed therein as well as thrust bearing magnets 57. The thrust bearing magnets 57 are configured to magnetically couple with the magnets 36 in order to hold the shaft assembly in the housing 30 and to magnetically couple with the magnets 26 to hold the pneumatic motor 22 (which is connected to the magnets 26 through the sleeve 24) above the housing the 30. As will be understood by the skilled worker, other type of coupling between the housing 30 and the shaft assembly 32 are also within the scope of the present disclosure. As an example, any suitable thrust ball bearing or fluid thrust bearing can be used.

As will be understood by the skilled worker, any suitable type of pneumatic motor powered by a compressed fluid may be used without departing from the scope of the present disclosure. Such pump motors can include, for example, a disc flow motor, a vane motor, an impulse turbine, a reaction turbine, a Tesla turbine, etc.

Figure 5:
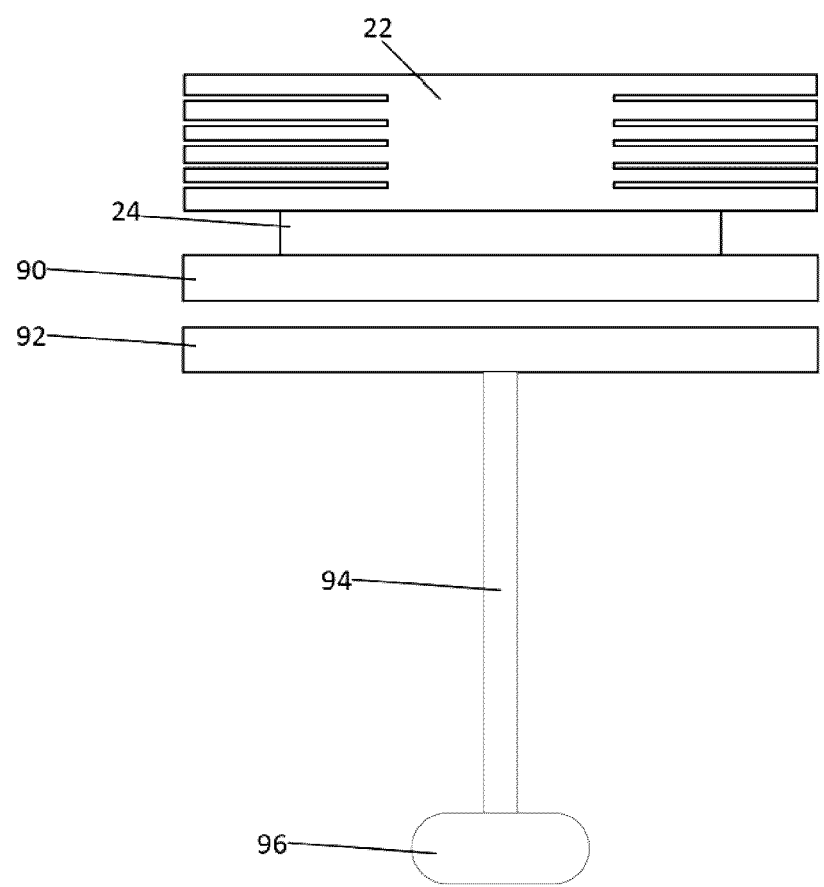
FIG. 5 shows a side elevation view of a pneumatic motor and a magnet assembly space-apart from a conductive metal plate to which a shaft and a flow inducer assembly are connected.

Further, even though the coupling between the pneumatic motor 22 and shaft assembly 32 is shown as a magnetic coupling, other suitable electromagnetic based coupling could be used without departing from the scope of the present disclosure. Such electromagnetic coupling can include an eddy current system with a flat plate of rotating permanent magnets inducing rotation in a conducting metal plate connected to the pump shaft. Such a system would have a flat section of static shield between the two rotating plates to provide a similar sealed system to the present disclosure. FIG. 5 shows a side elevation view of the pneumatic motor 22 of FIG. 1C connected to a magnet assembly 90 through a sleeve 24. The magnet assembly 90 is adjacent a conductive metal plate 92 to which a shaft 94 is connected. A flow inducer assembly 96 is connected to the shaft 94.

Figure 6:
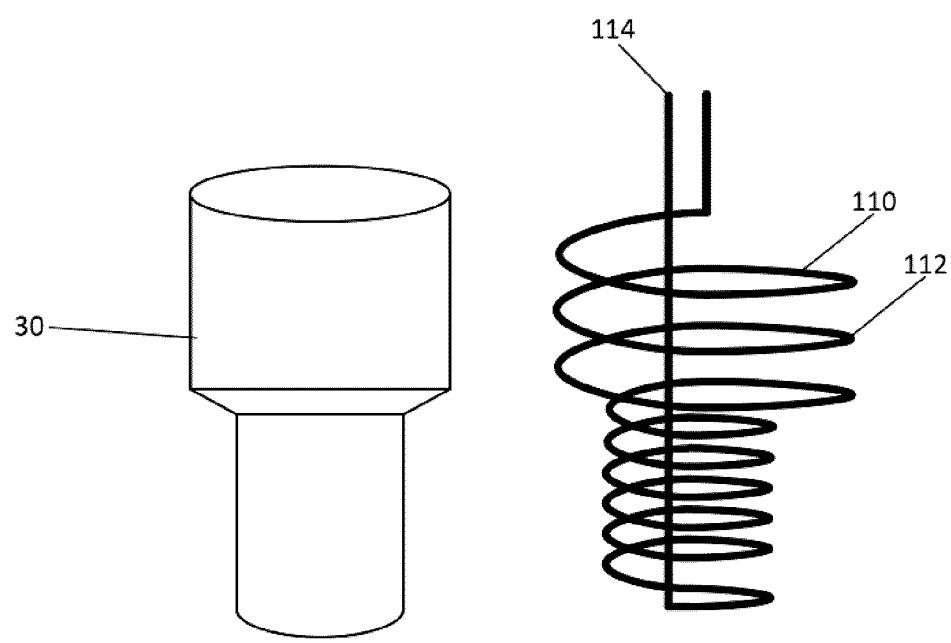
FIG. 6 shows an example of a cooling structure that can be used in the flow induction system of the present disclosure.

FIG. 6 shows another example of a cooling structure that can be used in the flow induction system of the present disclosure. The cooling structure of FIG. 6 is a coil 110 configured to encircle the housing 30, which is shown separate from the coil on this Figure. The coil 110 is made of a coiled tube 112 through which expanded and cooled gas (or, more generally, cooled fluid) circulates. The gas is input from the pneumatic motor 22 (FIG. 1) at the coil input 114 and output at the coil output 116 and from there, to the outlet 44 (FIG. 1). The coiled tube 112 can be made of any suitable material that, when disposed in thermal contact with the housing 30, can extract heat from the housing 30.

Even though the flow inducer assembly 52 shown in FIGS. 1 and 2 includes a boundary layer, disc flow inducer, any other suitable type of flow inducer can be used without departing from the scope of the present disclosure. For example, any suitable impeller or propeller can be used.

The pump system of the present disclosure can be used in high-temperature environments such as in molten salt nuclear reactors where the pump system is configured to pump molten salt.

Figure 7:
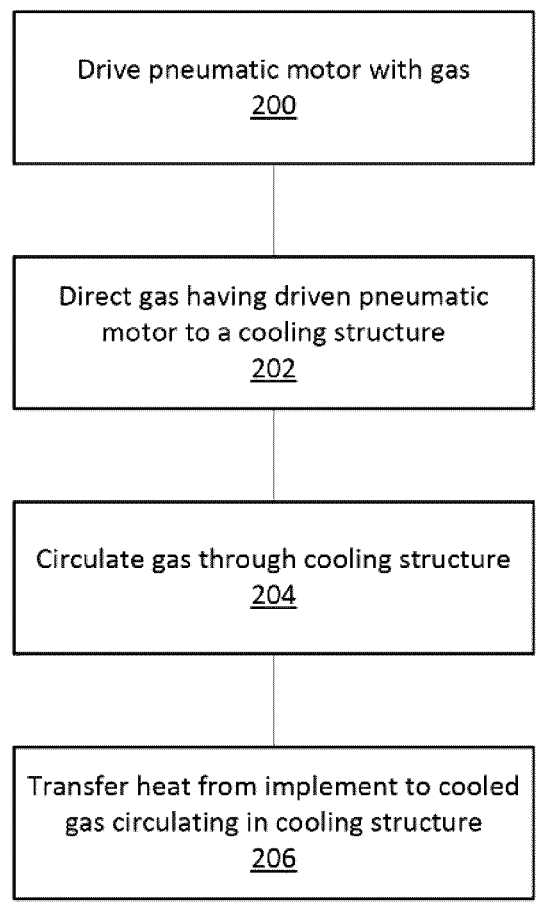
FIG. 7 shows a flowchart of an example of a method of operating a pneumatic motor assembly, in accordance with the present disclosure.

FIG. 7 is a flowchart of an example of a method of operating a pneumatic motor assembly, in accordance with the present disclosure. At action 200, a gas is circulated through a pneumatic motor to drive the pneumatic motor into rotation. The pneumatic motor is coupled to an implement such that powering the pneumatic motor transfers torque to the implement. At action 202, the gas that has driven the pneumatic motor is directed to a cooling structure, which is thermally connected to the implement. At action 204, the gas is circulated through the cooling structure. The gas expands when circulating through at least one of the pneumatic motor and the cooling structure. The expansion of the gas causes a reduction in temperature of the gas, which results in a cooled gas. At action 206, heat is transferred from the implement to the cooled gas.

As such, the method of FIG. 7 relates to powering a pneumatic motor with a gas and using the same gas to cool an implement driven by pneumatic motor.

In the context of the flow induction system of the present disclosure, the implement can be the shaft assembly 32 shown at FIG. 1, which is connected to the pneumatic motor 22.

In the preceding description, for purposes of explanation, numerous details are set forth in order to provide a thorough understanding of the embodiments. However, it will be apparent to one skilled in the art that these specific details are not required. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A pneumatic motor assembly comprising:
   a pneumatic motor configured to receive a gas, the gas received at the pneumatic motor being a compressed gas, the compressed gas to circulate through the pneumatic motor to drive the pneumatic motor into rotation, the pneumatic motor further configured to output the compressed gas subsequent to the compressed gas having driven the pneumatic motor;
   a magnet assembly connected to the pneumatic motor, the pneumatic motor configured to rotate the magnet assembly; and
   a cooling jacket surrounding the pneumatic motor and the magnet assembly, the cooling jacket having a partition, the cooling jacket being thermally connected to the magnet assembly, the cooling jacket configured to receive the compressed gas output from the pneumatic motor, the compressed gas received at the cooling jacket to circulate through the cooling jacket downwards between the magnet assembly and the partition and, subsequently, upwards between the partition and an outer wall of the cooling jacket, the compressed gas to expand when circulating through at least one of the pneumatic motor and the cooling jacket, an expansion of the compressed gas causing a reduction in temperature of the compressed gas to obtain a cooled gas, the cooling jacket configured to transfer heat from the magnet assembly to the cooled gas circulating in the cooling jacket.

2. The pneumatic motor assembly of claim 1 wherein the magnet assembly is a first magnet assembly, the first magnet assembly is configured to magnetically couple to a second magnet assembly to rotate the second magnet assembly.

3. The pneumatic motor assembly of claim 2 wherein the second magnet assembly comprises a metal plate, the first magnet assembly is configured to generate an eddy current in the metal plate to magnetically couple the first magnet assembly to the second magnet assembly.

4. The pneumatic motor assembly of claim 1 wherein the pneumatic motor is one of a disc flow motor, a turbine, and a Tesla turbine.

5. A flow induction system to induce flow in a liquid, the flow induction system comprising:
- a pneumatic motor configured to receive a gas, the gas received at the pneumatic motor being a compressed gas, the compressed gas to circulate through the pneumatic motor to drive the pneumatic motor into rotation, the pneumatic motor further configured to output the compressed gas subsequent to the compressed gas having driven the pneumatic motor;
- a magnet assembly connected to the pneumatic motor, the pneumatic motor configured to rotate the magnet assembly;
- a shaft assembly magnetically coupled to the magnet assembly, the shaft assembly having a flow inducer assembly configured for immersion in the liquid, the magnet assembly configured to rotate the shaft assembly and the flow inducer assembly to induce flow in the liquid; and
- a cooling jacket surrounding the pneumatic motor and the magnet assembly, the cooling jacket having a partition, the cooling jacket being thermally connected to the magnet assembly, the cooling jacket configured to receive the compressed gas output from the pneumatic motor, the compressed gas received at the cooling jacket to circulate through the cooling jacket downwards between the magnet assembly and the partition and, subsequently, upwards between the partition and an outer wall of the cooling jacket, the compressed gas to expand when circulating through at least one of the pneumatic motor and the cooling jacket, an expansion of the compressed gas causing a reduction in temperature of the compressed gas to obtain a cooled gas, the cooling jacket to transfer heat from the magnet assembly to the cooled gas circulating in the cooling jacket.

6. The flow induction system of claim 5 wherein the magnet assembly connected to the pneumatic motor is a first magnet assembly, and the shaft assembly comprises a second magnet assembly that magnetically couples to the first magnet assembly.

7. The flow induction system of claim 5 wherein the shaft assembly has a conductive metal plate and the magnet assembly is configured to generate an eddy current in the conductive metal plate to magnetically couple the magnet assembly to the shaft assembly.

8. The flow induction system of claim 5 wherein the pneumatic motor is one of a disc flow motor, a turbine, and a Tesla turbine.

9. The flow induction system of claim 5 wherein the flow inducer assembly comprises one of an impeller, a propeller, and flow plates.

10. The flow induction system of claim 5 further comprising a housing formed between the magnet assembly and the shaft assembly, the housing configured to house at least a portion of the shaft assembly.

11. The flow induction system of claim 10 further comprising thrust bearing magnets secured to the housing, the thrust bearing magnets configured to support the shaft assembly.

12. The flow induction system of claim 10 further comprising centering magnets secured to the housing, the centering magnets to center the shaft assembly in the housing.

* * * * *